United States Patent
Nicoll et al.

(10) Patent No.: US 8,906,121 B2
(45) Date of Patent: Dec. 9, 2014

(54) FLUIDIZED BEDS, SIZING OF FLUIDIZED MEDIUM INLET HOLES AND METHODS OF FLUIDIZING

(75) Inventors: David H. Nicoll, Houston, TX (US); Timothy E. Vail, Houston, TX (US)

(73) Assignee: Synthesis Energy Systems, Inc., Houston, TX (US)

( * ) Notice: Subject to any disclaimer, the term of this patent is extended or adjusted under 35 U.S.C. 154(b) by 645 days.

(21) Appl. No.: 11/853,933

(22) Filed: Sep. 12, 2007

(65) Prior Publication Data

US 2009/0065743 A1 Mar. 12, 2009

(51) Int. Cl.
- *B01J 7/00* (2006.01)
- *B01J 8/44* (2006.01)
- *B01J 8/18* (2006.01)
- *C10J 3/48* (2006.01)

(52) U.S. Cl.
CPC *B01J 8/44* (2013.01); *B01J 8/1818* (2013.01); *C10J 3/482* (2013.01); *C10J 2200/152* (2013.01); *C10J 2300/093* (2013.01); *C10J 2300/0956* (2013.01); *C10J 2300/0959* (2013.01); *C10J 2300/0973* (2013.01)
USPC .......................................................... 48/61

(58) Field of Classification Search
None
See application file for complete search history.

(56) References Cited

U.S. PATENT DOCUMENTS

| | | | | |
|---|---|---|---|---|
| 3,863,359 A | * | 2/1975 | Grega | 34/584 |
| 4,259,088 A | * | 3/1981 | Moss | 48/212 |
| 4,854,249 A | * | 8/1989 | Khinkis et al. | 110/342 |
| 5,230,868 A | * | 7/1993 | Engstrom | 422/143 |
| 5,753,191 A | * | 5/1998 | Yamamoto et al. | 422/143 |
| RE37,300 E | * | 7/2001 | Nagato et al. | 122/4 D |
| 2002/0008052 A1 | * | 1/2002 | Hedrick | 208/113 |
| 2004/0060393 A1 | * | 4/2004 | Taskinen et al. | 75/451 |
| 2008/0179433 A1 | * | 7/2008 | Pfeffer et al. | 241/5 |
| 2009/0060806 A1 | * | 3/2009 | Maryamchik | 422/311 |

FOREIGN PATENT DOCUMENTS

WO     WO 2006053281 A1 *  5/2006

* cited by examiner

*Primary Examiner* — Imran Akram
(74) *Attorney, Agent, or Firm* — Kening Li; Miller Canfield

(57) ABSTRACT

A fluidized bed apparatus having a plurality of inlet holes for the introduction of fluidizing medium into a fluidized bed, wherein at least two, and preferably more, of the inlet holes have different cross sectional areas.

2 Claims, 3 Drawing Sheets

FLUIDIZED BEDS, SIZING OF FLUIDIZED MEDIUM INLET HOLES AND METHODS OF FLUIDIZING

BACKGROUND OF THE INVENTION

1. Field of the Invention

The present invention relates to fluidized beds, the sizing of inlet holes for the introduction of a fluidizing medium into a fluidized bed and methods of fluidizing. In another aspect, the present invention relates to fluidized bed reactors and to methods of gasification. In even another aspect, the present invention relates to fluidized bed coal and carbonaceous material gasification and to methods of coal and carbonaceous material gasification.

2. Description of the Related Art

Fluidization is commonly defined as an operation by which particulate fine solids are transformed into a fluid-like state through contact with a gas or liquid. Fluidized beds are known for their high heat and mass transfer coefficients, due to the high surface area-to-volume ratio of particulate matter to fluidizing medium. Fluidized beds are used in a wide variety of industrial processes such as chemical reactions, catalytic reactions, classifying, drying, mixing, granulation, coating, heating and cooling.

In many industrial applications, a fluidized bed consists of a vertically-oriented column filled with granular material with a fluid (gas or liquid) being pumped upwards through a distributor at the bottom of the bed. When the drag force of flowing fluid exceeds gravity, particles are lifted and fluidization occurs.

In a chemical reaction process, a fluidized bed suspends solids on upward-blowing air or liquid. The result is a turbulent mixing of gas or liquid and solids. The tumbling action, much like a bubbling fluid, provides more effective chemical reactions and heat transfer.

Fluidized bed technology is utilized in coal gasification. There are a number of patent applications that are directed toward fluidized beds and/or coal gasification.

A coal gasification reactor of the type wherein agglomerated coal ash is withdrawn from a fluid reaction bed of finely divided coal without the removal of the finely divided coal particles is disclosed in Jequier et al, U.S. Pat. No. 2.906.608 and Matthews et al. U.S. Pat. No. 3,935,825. These patents are incorporated herewith by reference.

In a coal to gas conversion process of the type referenced, a vessel is provided for a fluidized bed. A gas distribution grid is usually positioned in the vessel and defines the bottom surface of the fluidized bed. The central portion of the grid may be conical or cylindrical in shape and comprises a passage. At the bottom of the passage, a constriction is provided having a fixed opening defining a venturi of fixed throat size to provide a uniform upward gas velocity into the vessel and thus into the fluidized bed. Directing a stream of high velocity gas through the venturi or passage into the reaction vessel causes ash particles in the vessel agglomerate and eventually discharge through the passage and venturi throat.

U.S. Pat. No. 4,023,280, issued May 17, 1977, to Schora et al., discloses a fluidized bed of material retained in a vessel which receives a high velocity gas stream through a venturi orifice and passage to assist in the agglomeration of ash particles. The particles form a semi-fixed bed within the passage upstream from the venturi orifice. The particular dimensions of the semi-fixed bed are dependent, in part, upon the orifice size of the venturi. An iris valve defining the orifice permits adjustment of the cross-sectional area of the orifice and thereby controls the velocity of the gas stream through the venturi.

U.S. Pat. No. 4,435,364, issued Mar. 6, 1984, to Vorres, discloses an apparatus for withdrawing agglomerated solids, e.g. ash, from a fluidized bed of finely divided solid hydro-carbonaceous material, e.g. coal, is described. Agglomeration is effected by a high temperature reaction between the inorganic constituents of the hydro-carbonaceous material in the fluidized bed environment. A venturi is utilized to serve as a passage for withdrawing the agglomerated solids from the fluidized bed. Spiral or other descending ridges are positioned on the interior surface of the constricted cylindrical opening of the venturi to permit variable and increased rates of agglomerate discharge with improved separation and classification of the solid materials.

U.S. Pat. No. 4,453,495, issued, Jun. 12, 1984, to Strohmeyer, Jr., discloses an integrated control for a steam generator circulating fluidized bed firing system. The system includes an integrated control means, particularly at partial loads, for a steam generator having a circulating fluidized bed combustion system wherein gas recirculation means is used to supplement combustion air flow to maintain gas velocity in the circulation loop sufficient to entrain and sustain particle mass flow rate at a level required to limit furnace gas temperature to a predetermined value as 1550 F. and wherein gas recirculation mass flow apportions heat transfer from the gas and recirculated particles among the respective portions of the steam generator fluid heat absorption circuits, gas and circulating particle mass flow rates being controlled selectively in a coordinated manner to complement each other in the apportionment of heat transfer optimally among the fluid heat absorption circuits while maintaining furnace gas temperature at a predetermined set point.

U.S. Pat. No. 4,454,838, issued Jun. 19, 1984, to Strohmeyer, Jr., discloses a dense pack heat exchanger for a steam generator having a circulating fluidized bed combustion system whereby a bed of solid particles comprising fuel and inert material is entrained in the furnace gas stream. Means are provided for collecting high temperature bed solid particles downstream of the furnace. The dense pack heat exchanger directs the hot collected particles down over heat transfer surface, such surface being a portion of the steam generator fluid circuits. Flow is induced by gravity means. The dense compaction of the solid particles around the fluid heat exchange circuits results in high heat transfer rates as the fluid cools the compacted solid material. The heat exchange surface is arranged to facilitate flow of the solid particles through the heat exchanger.

U.S. Pat. No. 4,462,341, issued Jul. 31, 1984, Strohmeyer, Jr. discloses a steam generator having a circulating fluidized bed combustion system whereby there is provision to admit air flow incrementally along the gas path to control combustion rate and firing temperature in a manner to maintain differential temperatures along the gas path. The initial portion of the gas path where combustion is initiated can be held in one temperature range as 1550 F. which is optimum for sulphur retention and the final portion of the combustion zone can be elevated in temperature as to 1800 F. to produce a greater degree of heat transfer through the gas to fluid heat exchange surface downstream of the combustion zone.

U.S. Pat. No. 4,745,884, issued May 24, 1988, to Coulthard, discloses a fluidized bed steam generating system includes an upstanding combustion vessel, a gas/solids separator, a convection pass boiler and a heat exchanger positioned directly below the boiler and all of the above elements except the gas/solids separator are enclosed within a waterwall structure having outside waterwalls and a central waterwall common to the reactor vessel on one hand and the convection pass boiler and heat exchanger on the other hand. The close proximity of the components of the system eliminate numerous problems present in conventional multi-solid fluidized bed steam generators.

U.S. Pat. No. 5,082,634, issued Jan. 21, 1992, to Raufast, discloses a fluidized bed apparatus comprising a fluidization grid arranged in the lower part of this apparatus, this grid being provided at its center with a circular aperture communicating with a discharge chamber and occurring in the form of a surface of revolution consisting of the joined lateral surfaces of at least two coaxial truncated cones of revolution, virtual vertices of which are oriented downwards.

In spite of all of the advancements in fluidized bed technology, one problem that may be encountered, is that of uneven flow of the fluidizing medium through the fluidized bed and through the inlet holes in the injection grid or other device for injecting fluidizing medium, especially if the injection grid is sloped and different fluid heads exist above the various inlet holes.

SUMMARY OF THE INVENTION

According to one non-limiting embodiment of the present invention, there is provided a fluidized bed apparatus. The apparatus includes a vessel having a top and bottom, and defining a fluidized bed region. The vessel further includes an injection grid comprising fluid inlet holes positioned to provide a fluidizing medium to region, wherein at least two of the holes have different diameters.

According to another non-limiting embodiment of the present invention, there is provided a method of fluidizing. The method includes introducing a fluid into a fluidized bed of particles, wherein the fluid is introduced into the bed through at least two inlet holes having different diameters.

According to even another non-limiting embodiment of the present invention, there is provided a method of coal or carbonaceous material gasification. The method includes introducing coal or carbonaceous particles into a fluidizing bed region of a vessel. The method further includes introducing a fluidizing medium comprising oxygen and steam through an injection grid into the fluidized bed region, wherein the grid comprises at least two inlet holes having different cross sectional areas.

DETAILED DESCRIPTION OF THE INVENTION

Figure 1:
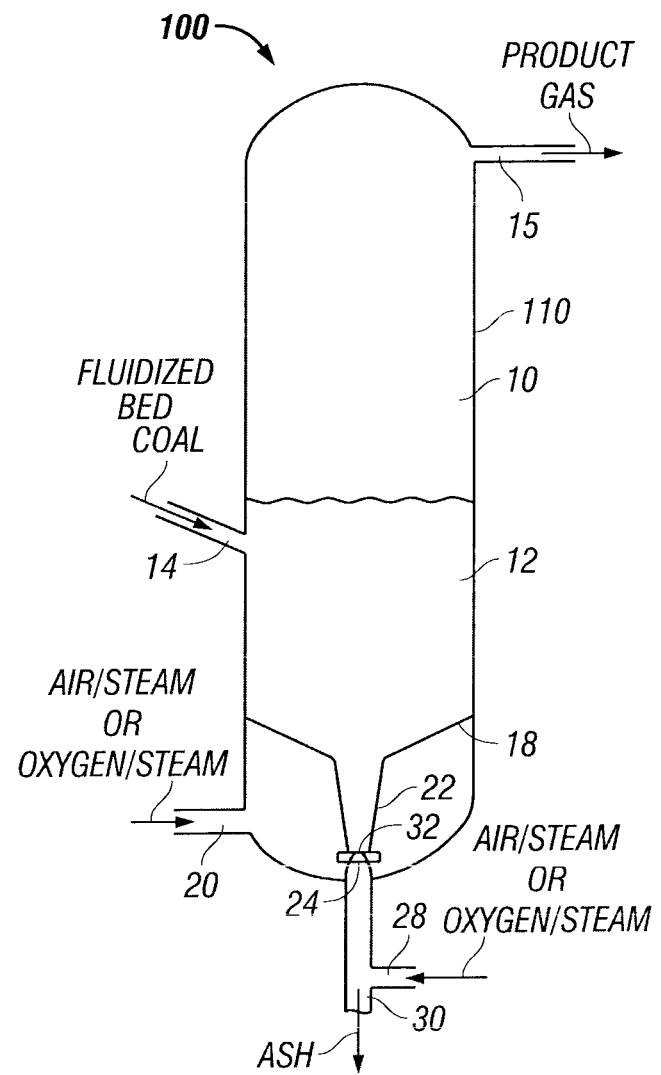
FIG. 1 is a schematic representation of one non-limiting example of a fluidized bed of the present invention.

The various embodiments of the grid of the present invention comprise holes suitable for the introduction of a fluidizing medium into a fluidized bed to fluidize solid particulate matter in the bed. In non-limiting embodiments, the inlet holes comprise at least two, preferably at least three, more preferably at least four, even more preferably at least five inlet holes, still more preferably at least six, yet more preferably at least seven, and even still more preferably at least eight, which comprise different cross sectional areas. The present invention contemplates that various apparatus may incorporate the apparatus that include the inlet holes, including, but not limited to reactors, mixers, sparging units, and fluidized beds.

The various embodiments of fluidized beds of the present invention include a number of inlet holes for the introduction of the fluidizing medium, wherein at least two of the inlet holes, preferably at least three inlet holes, more preferable at least four inlet holes, and even more preferably at least five inlet holes, comprise different cross sectional areas. These inlet holes may be situated anywhere in the fluidized bed as may be desired. As non-limiting examples, these inlet holes may be defined by a grid, may be defined by a wall of the fluidized bed, or may be defined by any portion of the fluidized bed. Any suitable cross-sectional size, geometric shape, or arrangement of holes may be utilized as desired to achieve operating parameters. For example, the size, shape and arrangement of holes may be selected as may be desired for providing any desired for controlling and distributing the fluidizing medium into the fluidized bed.

In one non-limiting embodiment, the cross sectional area of the inlet hole decreases as the inlet hole is positioned radially away from the center of the bed. Alternatively, in another non-limiting embodiment, the cross sectional area decreases as the inlet holes is positioned radially closer to the center of the bed.

In even another non-limiting embodiment, the cross-sectional area is smaller for those inlet holes having a smaller fluid head above the port, and larger for those inlet holes having a larger fluid head above the port. In a non-limiting example of such an arrangement, for a conically shaped distribution grid having a low portion in the center, fluid head above the inlet holes decreases as the inlet holes are positioned radially away from the center, and thus, cross sectional areas of the inlet hole decreases as the inlet hole is positioned radially away from the center.

Certainly, as another non-limiting embodiment, the opposite arrangement may be utilized to distribute fluidizing medium in a different manner, that is, cross sectional areas of the inlet holes may increase as the inlet hole is positioned radially away from the center.

In other embodiments, the cross sectional areas of the inlet holes are selected to provide for any desired combination of total pressure drop taking into account the pressure drop through the hole plus the fluid head above the hole. It may be that this total pressure is to be equal (within any desired tolerance) for each hole, in which case holes with greater fluid head above the hole may have larger cross sectional areas, and holes with smaller fluid head above the hole may have smaller cross sectional areas. Certainly, as another non-limiting embodiment and for a different distribution of fluidizing medium, holes with greater fluid head above the hole may have smaller cross sectional areas, and holes with smaller fluid head above the hole may have larger cross sectional areas.

In still even another embodiment, the cross sectional areas of various inlet holes are selected so that the volumetric flow through the various inlet holes is approximately equal within a selected design tolerance for the given head above the inlet holes.

In still yet other non-limiting embodiments, the cross sectional areas of the various inlet holes are selected so that the linear velocity of the fluid passing through the various ports may be controlled as desired for the application. This will allow for various flow patterns to be implemented within the fluidizer. For example, it may be desired to have a greater linear liquid velocity for those inlet holes nearer the exterior wall of the fluidizer. Alternatively, it may be desired to have a greater linear liquid velocity for those inlet holes at the center of the fluidizer or at other locations in the fluidized bed. It may be desired to have turbulent flow through certain inlet holes and laminar flow through other inlet holes. It may also be desired to vary the Reynolds number of flow through the various inlet holes. All of these may be accomplished by varying the cross sectional area of the inlet holes.

A non-limiting embodiment of a fluidized bed of the present invention is shown in FIG. 1, which shows a schematic drawing of a fluidized bed gasifying apparatus or device 100 that includes means for agglomerating ash or particulate in the fluidized bed. Such a device has been described in Jequier et al U.S. Pat. No. 2,906,608 and Matthews et al U.S. Pat. No. 3,935,825, both herein incorporated by reference.

Figure 5:
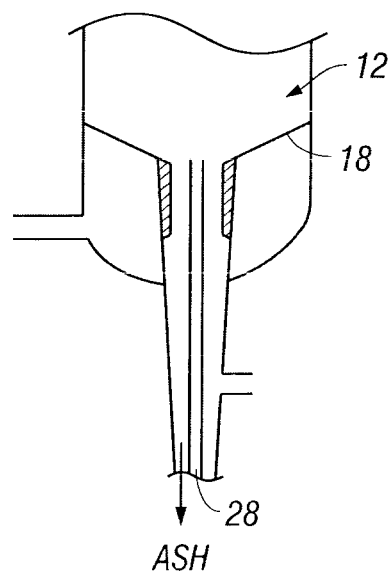
FIG. 5 is a non-limiting partial view of another embodiment of vessel 10, showing an annular arrangement in the lower portion of vessel 10, specifically, air/steam, enriched air/steam or oxygen/steam enter through pipe 28, and ash is removed through annular passage 22A.

As another embodiment, the present invention also contemplates an annular solids removal arrangement, such as that shown in FIG. 5. Vessel 10 of FIG. 5 is as described above, except for the annular arrangement in the lower portion of vessel 10 in which there is a separate inlet air/steam or oxygen/steam pipe annularly positioned within the ash removal pipe. Specifically, air/steam or oxygen/steam enter through a central pipe 28, and ash is removed through annular passage 22A. Certainly there may more than one central pipe 28, and in the event of more than one central pipe 28, these pipes 28 may be of different cross sectional areas.

Briefly, device 100 includes a vessel 10 within which a fluidized bed 12 is retained. Vessel 100 further comprises outer wall 110. Pulverized fresh feed coal enters via line 14 and is contained within the bottom portion of the vessel or reactor 10 as a fluid bed 12 having a bed density that may be in the range of about 15 to 50 pounds per cubic foot. The coal within bed 10 is converted by reaction with steam and air to gaseous fuel components. These gaseous fuel components pass from the vessel 10 through a discharge line 16.

A shaped sloped grid 18 is provided within vessel 10 at the bottom of bed 12. A medium comprising oxygen, non-limiting examples of which include air, enriched air or oxygen, and steam enter through a line 20 and pass through inlet holes 118 in grid 18 to assist in maintenance of bed 12 in a fluidized state. The ash contained in the feed coal within bed 12 generally settles near the bottom of fluid bed 12 due to its greater density. Thus, the ash particles flow down the sides of the generally conical grid 18 and pass into or enter a withdrawal chamber or particle exit passage 22 that is formed as part of the grid 18.

Figure 2:
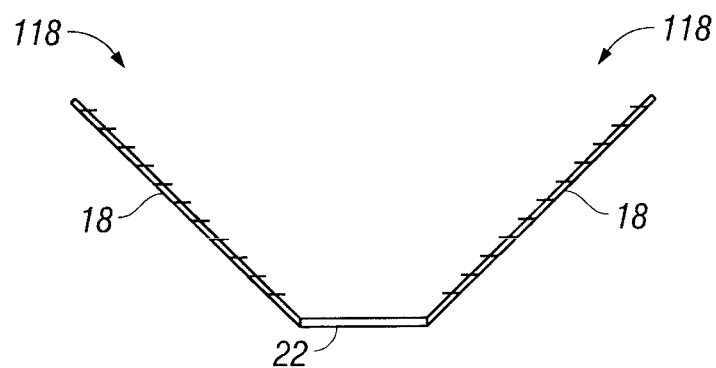
FIG. 2 is a non-limiting side view of a fluidized bed of the present invention showing the grid inlet holes.
Figure 3:
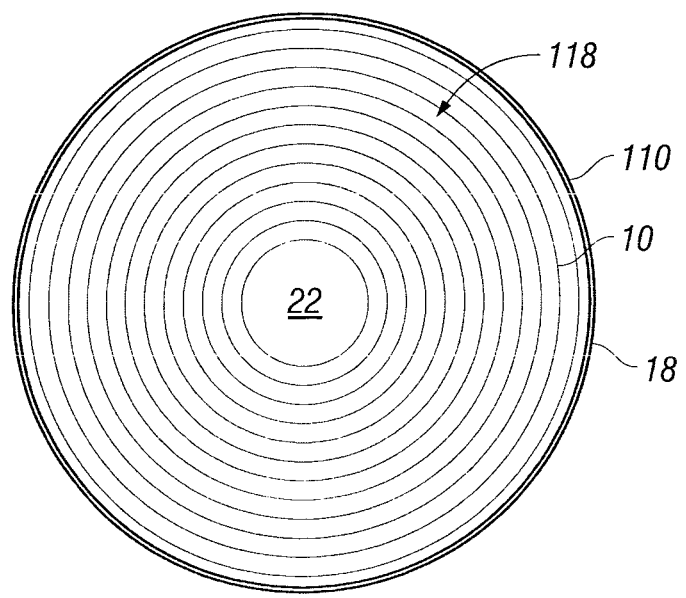
FIG. 3 is non-limiting view of the inside bottom of the fluidized bed of the present invention, showing the grid with concentric rings of inlet holes.

Referring additionally to FIG. 2 there is shown a cutaway side view of a portion of vessel 10 showing grid 18 and inlet fluid holes 118, comprising inlet hole rows 1-11. FIG. 3 shows a top view of the inside bottom of vessel 10, looking down upon grid 18 and concentric rings inlet fluid holes 118.

According to the present invention, inlet fluid holes 118 may be of any suitable cross sectional area that will allow passage of a fluidizing gas, and allow for the fluidizing of fluidized bed 12. More particularly, at least two inlet holes, 118, preferably at least three, more preferable at least four, and even more preferable at least five, six, seven, or eight, will have different cross sectional areas. Even more particularly, moving radially away from passage 22 and toward wall 110 of vessel 10, the cross sectional area of rows of inlet holes 118 will decrease. In other words, the holes of inlet hole rows 8, 9, 10, and 11, closer to particle exit passage 22 will have larger cross sectional areas than the ports of inlet hole rows 1, 2, 3, and 4, closer to wall 110.

For the particular non-limiting design as shown in FIGS. 2-3, the particulars of grid 18 and inlet ports 118 are provided in the following Table 1.

TABLE 1

GRID FLUIDIZING HOLE TABLE

| ROW | NO. OF HOLES | DIA of each row of holes M | SPACING between each hole M/HOLE | ID of each hole inch | ID M | AREA $M^2$/HOLE | $M^2$ of holes in each Row |
|---|---|---|---|---|---|---|---|
| 1 | 22 | 2.295 | 0.105 | 0.140 | 0.00359 | 0.000010 | 0.0002 |
| 2 | 20 | 2.140 | 0.105 | 0.150 | 0.00385 | 0.000012 | 0.0002 |
| 3 | 19 | 1.984 | 0.106 | 0.160 | 0.00410 | 0.000013 | 0.0002 |
| 4 | 18 | 1.828 | 0.104 | 0.170 | 0.00435 | 0.000015 | 0.0003 |
| 5 | 16 | 1.672 | 0.104 | 0.180 | 0.00462 | 0.000017 | 0.0003 |
| 6 | 15 | 1.516 | 0.104 | 0.190 | 0.00487 | 0.000019 | 0.0003 |
| 7 | 13 | 1.380 | 0.104 | 0.200 | 0.00513 | 0.000021 | 0.0003 |
| 8 | 12 | 1.204 | 0.105 | 0.220 | 0.00554 | 0.000025 | 0.0003 |
| 9 | 10 | 1.048 | 0.105 | 0.230 | 0.00590 | 0.000027 | 0.0003 |
| 10 | 8 | 0.992 | 0.105 | 0.240 | 0.00615 | 0.000030 | 0.0003 |
| 11 | 7 | 0.736 | 0.106 | 0.250 | 0.00841 | 0.000032 | 0.0002 |

Figure 4:
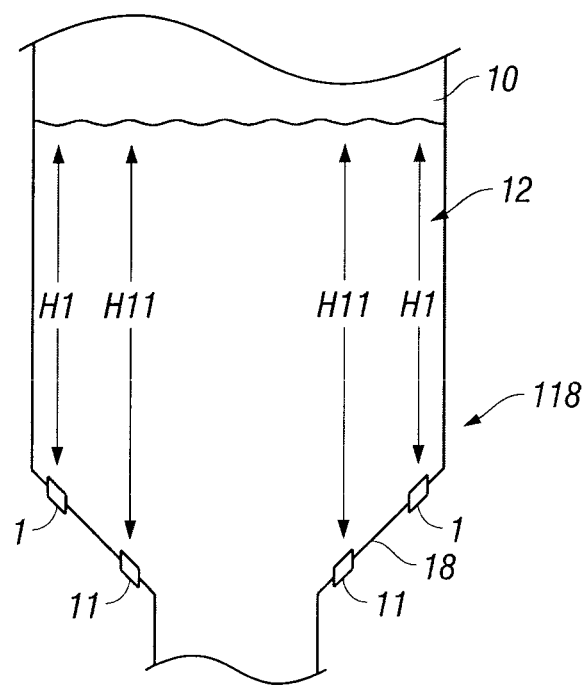
FIG. 4 is a non-limiting schematic representation of a portion of vessel 10, showing fluidized bed 12, distribution grid 18, inlet holes 118, and selected inlet hole rows 1 and 11.

As explained earlier, in other embodiments, the cross-sectional area is smaller for those inlet holes having lesser fluid head above the inlet hole, and larger for those holes having greater fluid head above the inlet hole. Referring now to FIG. 4, there is shown a schematic representation of a portion of vessel 10, showing fluidized bed 12, distribution grid 18, inlet holes 118, and selected inlet hole 1 and 11. Notice, that fluid head H11 above inlet holes 118 of inlet hole row 11 is greater than fluid head H1 above inlet holes 118 of inlet hole row 1. Consequently, in this non-limiting embodiment, the inlet holes of row 1 have a smaller cross sectional area than the inlet holes of row 11. Certainly, in other non-limiting embodiments, where other flow patterns are desired in the fluidized be the opposite arrangements, where the inlet holes with the greater fluid head have a smaller cross sectional area may be utilized.

Various methods of the present invention include the step of fluidizing particles by directing a fluidizing medium at the bed through inlet holes, wherein at least two inlet holes, preferably at least three, more preferably at least four, and even more preferably at least five, six, seven or eight, comprise different cross sectional areas. The inlet holes may be arranged in a distribution grid or other device (as a non-limiting example, a sparger) and connected to and/or supplied by a common fluidizing medium source The fluidized beds of the present invention having interchangeable inserts will be operated as is well known to those of skill in the art. Essentially air, enriched air, oxygen and steam are provided as the fluidizing medium. Particles of coal and ash are formed into a fluidized bed, and suitable conditions are provided to combust the coal thereby forming product gas. Ash particles are removed through the bottom of the fluidized bed. According to methods of the present invention, various interchangeable venturi inserts are utilized as necessary to select ash particles as desired.

As another embodiment, the present invention also contemplates an annular solids removal arrangement, such as that shown in FIG. 5. Vessel 10 of FIG. 5 is as described above, except for the annular arrangement in the lower portion of vessel 10. Specifically, Air/steam or oxygen/steam enter through a central pipe 28, and ash is removed through an annular passage having a venturi for controlling ash removal. Certainly, there may more than one central pipe 28, and in the event of more than one central pipe 28, these pipes 28 may be of different cross sectional areas.

While the present invention has been illustrated by circular shape holes, it should be understood that any desired geometric shape for the holes may be utilized, including any regular or irregular geometric shape. While the holes have been illustrated as being arranged in a series of concentric rings, certainly, any suitable arrangement of holes may be utilized as desired.

The present invention has been described mainly by reference to coal gasification. It should be appreciated, that the present invention is not limited to coal gasification, but rather finds utility in the gasification of any type of materials containing solid hydrocarbon material, non limiting examples of which include petroleum coke and biomass. It should also be appreciated, that the present invention is not limited to coal gasification, but rather, finds utility in many applications in which fluidizing of particles is desired.

What is claimed is:

1. A fluidized bed apparatus comprising:
   a vessel having a top and a bottom, and a conically shaped injection grid sloping downward in the vessel, wherein the grid is underneath and defining the bottom of a fluidized bed region, and comprises a center connected to a venturi through which a fluidizing medium is provided into the fluidized bed region, and wherein fluid inlet holes are formed on the grid, wherein the inlet hole each has a cross-sectional area, and the cross sectional area of the inlet holes decreases with increasing distance from the center of the grid;
   wherein the inlet holes are arranged in a plurality of successive concentric rings around the center of the grid, wherein the cross sectional area of the holes in each ring is about the same but smaller than that of the holes in a ring closer to the center.

2. The apparatus of claim 1, wherein the sum of the cross sectional area of all the holes in each ring is about the same.

* * * * *